US010695907B2

(12) United States Patent
Chattopadhyay et al.

(10) Patent No.: US 10,695,907 B2
(45) Date of Patent: Jun. 30, 2020

(54) METHODS AND APPARATUS FOR MONITORING ROBOT HEALTH IN MANUFACTURING ENVIRONMENTS

(71) Applicant: Intel Corporation, Santa Clara, CA (US)

(72) Inventors: Rita Chattopadhyay, Chandler, AZ (US); Mruthunjaya Chetty, Beaverton, OR (US); Jeffrey Davis, Gilbert, AZ (US); Stephanie Cope, Tempe, AZ (US); Xiaozhong Ji, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 15/721,473

(22) Filed: Sep. 29, 2017

(65) Prior Publication Data

US 2019/0099886 A1  Apr. 4, 2019

(51) Int. Cl.
B25J 9/16 (2006.01)
G01N 19/08 (2006.01)
G06Q 10/06 (2012.01)
G05B 19/418 (2006.01)
G05B 23/02 (2006.01)

(52) U.S. Cl.
CPC .......... B25J 9/1674 (2013.01); B25J 9/1602 (2013.01); G01N 19/08 (2013.01); G05B 19/418 (2013.01); G05B 23/024 (2013.01); G05B 23/0272 (2013.01); G06Q 10/0639 (2013.01); G05B 2219/37434 (2013.01)

(58) Field of Classification Search
CPC ....... B25J 9/1602; B25J 9/1674; G01N 19/08; G05B 19/418; G05B 23/0272; G06Q 10/0639
See application file for complete search history.

(56) References Cited

U.S. PATENT DOCUMENTS 6,424,137 B1 * 7/2002 Sampson .............. B24B 37/013
324/76.21
7,043,403 B1 * 5/2006 Wang ................... G05B 23/024
702/182
9,296,105 B2 3/2016 Merry et al.
(Continued)

FOREIGN PATENT DOCUMENTS

JP 2006310349 11/2006

OTHER PUBLICATIONS

International Searching Authority, "Written Opinion and International Search Report", issued in connection with International Application No. PCT/US2018/048114, dated Dec. 13, 2018, 13 pages.

Primary Examiner — Ryan Rink
(74) Attorney, Agent, or Firm — Hanley, Flight & Zimmerman, LLC

(57) ABSTRACT

Methods, apparatus, systems, and articles of manufacture for monitoring robot health in manufacturing environments are described herein. An example system, to monitor health of a robot in a semiconductor wafer manufacturing facility, includes a sensor coupled to the robot. The sensor is to obtain a vibration signal representative of vibration of the robot. The example system also includes a health monitor extract a feature from the vibration signal, compare the feature to a threshold, and, in response to determining the feature satisfies the threshold, transmit an alert.

20 Claims, 8 Drawing Sheets

(56) References Cited

U.S. PATENT DOCUMENTS

| | | |
|---|---|---|
| 2006/0215347 A1 | 9/2006 | Wakabayashi |
| 2008/0215292 A1* | 9/2008 | Kato .................. G01M 13/021 |
| | | 702/183 |
| 2009/0100293 A1* | 4/2009 | LaComb ............ G05B 23/0229 |
| | | 714/26 |
| 2013/0044004 A1* | 2/2013 | Hwang ................ B24B 37/005 |
| | | 340/679 |
| 2014/0156070 A1 | 6/2014 | Merry et al. |
| 2014/0201571 A1* | 7/2014 | Hosek ................ G06F 11/2257 |
| | | 714/26 |
| 2014/0329439 A1* | 11/2014 | Chew ................ B24B 37/0053 |
| | | 451/5 |
| 2016/0184988 A1 | 6/2016 | Zhuan et al. |
| 2016/0189050 A1* | 6/2016 | Jaramillo-Velasquez .................... |
| | | G05B 23/024 |
| | | 706/52 |
| 2016/0270691 A1 | 9/2016 | Yu et al. |
| 2017/0043483 A1* | 2/2017 | Fine ....................... B25J 9/1676 |
| 2017/0293862 A1* | 10/2017 | Kamiya ................ G01M 15/02 |
| 2018/0154516 A1* | 6/2018 | Chiu ....................... B25J 9/1674 |
| 2019/0012851 A1* | 1/2019 | Korchev ............. G07C 5/0816 |

\* cited by examiner

METHODS AND APPARATUS FOR MONITORING ROBOT HEALTH IN MANUFACTURING ENVIRONMENTS

This disclosure relates generally to robots, and, more particularly, to methods and apparatus for monitoring robot health in manufacturing environments.

BACKGROUND

Semiconductor wafers are manufactured in highly controlled environments using one or more robots. Each of the robots may perform one or more functions in the overall assembly/manufacturing process. Wafer production is an extremely sensitive process and, thus, the robots are designed to perform very accurate and precise movements.

Figure 1:
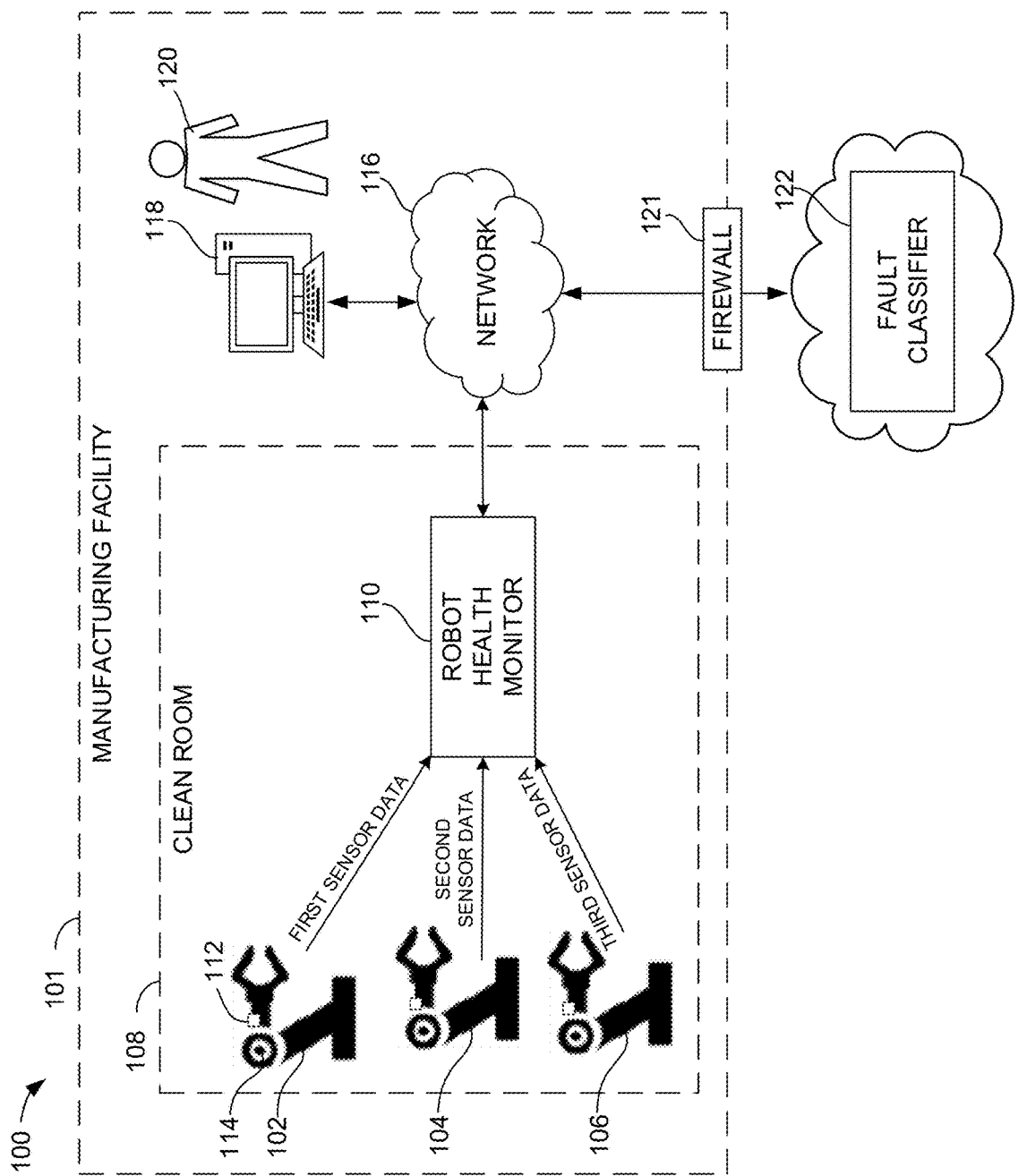
FIG. 1 illustrates an example robot health monitoring system constructed in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Manufacturing facilities often employ robots (e.g., robotic arms) to perform one or more operations in the manufacturing/assembly process of a product. The robots are programmed to perform precise movements that contribute to the overall production of an end-product. In some instances, such as with high volume manufacturing (HVM) of semiconductor wafers or chips, the precise control of robots is critical for ensuring the viability of the end-product (e.g., a wafer). For example, semiconductor wafers must maintain an extremely high quality threshold. If any of the robots are even slightly off, entire batches of wafers can be ruined. Even extremely small defects or inefficiencies in the operation of a robot can cause partial contamination of a wafer, wafer tip-over, and/or crash of wafers, which results in production yield loss, equipment down time, and significant economic loss.

Currently, the health of robots are determined by manually measuring vibrations at an end-effector (e.g., a tool) of a robot during a scheduled, periodic maintenance inspection. However, the effectiveness of these manual maintenance inspections are highly dependent on the experience of the maintenance personnel and, thus, are subject to human error. Further, these manual maintenance inspections disrupt the production process, which can result in large economic losses when the facility is not running. Also, by the time the scheduled maintenance inspection occurs, hundreds or even thousands of wafers may have been adversely affected by a malfunctioning robot and such wafers may have to be discarded, leading to enormous economic losses.

Disclosed herein are example methods, apparatus, systems, and articles of manufacture for monitoring and detecting potentially defective robots in a manufacturing facility, such a semiconductor wafer manufacturing facility. A defective or faulty robot is a robot that does not pass a quality threshold. For example, if a bearing, a belt, a motor, etc. of the robot is defective (although perhaps still operational), vibrations may occur that adversely affect the precision of movements of the robot, thereby negatively affecting the manufacturing process. Once a defective robot has been identified, the robot can be repaired and/or replaced. By quickly identifying and repairing/replacing defective robots in an automated, real time or substantially real time fashion (as opposed to at scheduled maintenance inspection), examples disclosed herein reduce the time(s) at which defective robot(s) are operating, thereby increasing the number of parts produced that satisfy a quality threshold, decreasing equipment downtime, and increasing productivity and/or yield.

Disclosed herein are example robot health monitoring systems that may be implemented to monitor one or more robots in a manufacturing facility or environment, such a semiconductor wafer manufacturing facility. In some examples, a health monitoring system includes a robot health monitor that analyzes data, in real time, obtained from one or more sensors carried by a robot. In some examples, the sensor(s) measure vibrations from the robot while the robot operates or performs functions. The sensor(s) output vibration signals representative of the vibrations of the monitored portion of the robot. A signal output by a sensor (referred to herein as the vibration signal) represents a measurement of the vibration and may exhibit one or more frequency(ies) having one or more amplitudes. The sensor (s) may be, for example, accelerometers (e.g., a triaxial microelectromechanical systems (MEMS) accelerometer) and/or other inertial measurement unit (IMU) devices (e.g., a gyroscope) that obtain motion data and/or vibration data of the robots that reflect motion of the equipment.

In some examples, the robot health monitor extracts one or more features (sometimes referred to as parameters) from the vibration signals collected by the sensor(s). The vibration signal(s) may be collected and/or processed in the frequency domain and/or the time domain. Some example features include the median frequency, the spectral energy, the root mean square, and/or the variance of the vibration signal(s) (e.g., the sensor data values). In other examples, other features may be selected, measured, and/or processed to determine the health of a robot. The feature(s) may be observable directly in the time domain and/or frequency domain representations of the signal and/or may be calculated based on those directly observable features. As used herein, a data point is a portion of the signal collected by a sensor, whether represented in the time domain or the frequency domain. A data point may be a sample of the signal corresponding to a point or interval in time. Each data point may have one or more features such as those identified above that may be extracted. Multiple data points may be considered as a set. In some examples, a set is defined based on time (e.g., a two second window of data points) or based on a quantity of data points (e.g., 1024 data points). Sets may be processed discretely or based on a sliding window. In some examples, a sliding window is advantageous in the context of frequency domain analysis to achieve smoothing. In some examples, such as where a triaxial accelerometer sensor is implemented, one or more of the features may be extracted from the vibration signal for vibrations in each of the X, Y, and Z directions (axes).

In some examples, the robot health monitor compares a feature extracted from a vibration signal to a threshold to detect any outliers (i.e., anomalies) that may exist in the vibration signal and, thus, in the vibrations measured from the robot. These outliers may be indicative of a potentially defective robot and, thus, can be used to identify a potentially faulty machine in real time or substantially real time. In some examples, the threshold may be based on a change from one or more previous values of the same type of feature. For example, the robot health monitor may determine if a feature (e.g., median frequency) is within a standard deviation multiple (sometimes referred to as a z-score) (e.g., 1.5, 2, 2.5, etc.) of previous (i.e., historical) values for the same feature over a time period (e.g., over the last 90 days). If the feature is outside the standard deviation of the historical record, the feature is considered an outlier and may be flagged as potentially indicating a faulty robot. In other examples, the feature may be compared to a baseline or threshold value established during calibration and/or during a time the robot was functioning properly. In other examples, other thresholds or reference values may be used. The example robot health monitor may similarly extract and compare other features in the vibration signal(s) to respective thresholds. Therefore, the example robot health monitor may continuously collect vibration signals and analyze the signals to detect any anomalies in real time or substantially real time (e.g., within five seconds of the occurrence). In some examples, if an outlier in one of the features is detected, the robot health monitor generates an alert or notification such that a repair or replacement work order may be placed and/or a technician may further review the data from the robot. In some examples, production may be immediately halted to prevent damage to the product(s) or part(s) being manufactured.

In some examples, some data processing occurs in the manufacturing facility and some data processing occurs outside of the manufacturing facility. For example, a robot health monitor may be disposed in a clean room with the robots to receive the raw sensor data (e.g., the vibration signal(s)) and generate alerts if any outlier features in the vibration signal(s) are detected. Then, the features may be transmitted to another computing device for further processing, such as fault classification. By performing some on-site processing of the sensor data (e.g., prior to exporting the data from the clean room to the remote facility), less data is transmitted (e.g., less bandwidth of an internet connection is used) and less processing procedures are performed at the remote facility to reduce a time for detecting and reacting to features that do not satisfy a threshold (e.g., fault detection analytics). Further, by processing the sensor data (e.g., the raw data) with the robot health monitor within the manufacturing facility, the sensor data remains within the physical boundaries of the manufacturing facility, which reduces privacy and/or security concerns that may be associated with exporting data for off-site processing. However, in examples in which no privacy and/or security concerns are present, the data collected by the sensor (e.g., the raw data/vibration signals) may be transmitted outside of the physical boundaries of the manufacturing facility for off-site processing and/or collection.

As mentioned above, disclosed herein are example fault classifiers that may be used to further process information collected by one or more sensors to identify or classify the type(s) of fault (e.g., bearing fault, motor fault, etc.) associated with the outlier feature(s). The fault classifier may be implemented by a local computing device (e.g., a server, a virtual machine, etc.) and/or by a cloud-based computing device (e.g., a server, a virtual machine, etc.) that is remote to the manufacturing facility. In some examples, the fault classifier performs a multi-variable analysis of the features extracted from the vibration signal(s) (by the robot health monitor) to determine if any of the alerts and/or notifications (generated by the robot health monitor) are incorrectly identified as an outlier (i.e., a false alarm or false positive). In other words, the fault classifier may be configured to detect false positives. In response to a false positive, the fault classifier may override and/or prevent generation of a false alarm, notification, and/or work order. In some examples, prior to classifying a robot as having a potential machine failure and/or requiring maintenance, a count of the number of outlier features is determined for a time period. For example, the fault classifier may compare the number of outlier features within a time period to a threshold (e.g., five outliers within 48 hours). If the number of outlier features within the time period exceeds the threshold, the robot may be flagged as potentially faulty, whereas if the number of outlier features does not exceed the threshold, the outlier measurements may be flagged as false alarms and an alert or notification may not be generated. In other examples, a cluster of outliers is additionally or alternatively compared to a threshold to determine whether an alarm should be triggered. For example, if four outliers occurred in the last minute, an alarm may be triggered (e.g., even if they are the only four outliers in the last 48 hours).

Thus, examples disclosed herein enable potential machine failures to be proactively identified, thereby enabling condition-based maintenance to be employed in large scale manufacturing processes such as those associated with producing semiconductor devices and/or semiconductor wafers. By proactively identifying potential machine failures, downtime associated with unexpected maintenance of such machinery may be reduced. In other words, examples disclosed herein enable potential machine failures to be identified and maintenance to be performed on an as needed basis, thereby enabling intervention before a large number of parts and/or end products are damaged or manufactured in a defective manner. In some examples, by monitoring for machine failures and performing maintenance on an as needed basis, lean inventory practices may be employed and maintenance cost may be reduced.

Turning now to the figures, FIG. 1 illustrates an example robot health monitoring system 100 (referred to herein as the system 100). The example system 100 is implemented in an example manufacturing facility 101 having one or more robots 102, 104, 106 used in the production of semiconductor wafers. In the illustrated example of FIG. 1, three robots are depicted: a first robot 102, a second robot 104, and a third robot 106. However, in other examples, the manufacturing facility 101 may include more or fewer robots.

A wafer, sometimes referred to as a slice or substrate, is a thin slice of a semiconductor material used in the fabrication of integrated circuits. Each of the robots 102, 104, 106 may perform one or more functions in the assembly and/or manufacturing of a wafer. Wafer production is an extremely sensitive process. As such, in some examples, the robots 102, 104, 106, along with other manufacturing machines, are disposed in a clean room 108 (e.g., a class 1 clean room) that is not accessible by humans during normal operation. Facility personnel (e.g., employees, outside vendors, servicers, etc.) may monitor the operations of the manufacturing process from a control room, for example.

The integrity of the robots 102, 104, 106 can be crucial for the manufacturing process. Small defects or faults in the robots 102, 104, 106 can result in vibrations that compromise the precision of the robot(s) 102, 104, 106 and cause corrupted wafers. Faults may relate to the bearing(s), the belt(s), the motor(s), etc. of the robots 102, 104, 106. To reduce robot faults, the example system 100 of FIG. 1 includes a robot health monitor 110 that monitors the health of one or more of the robots 102, 104, 106. The example robot health monitor 110 analyzes vibration data from the robots 102, 104, 106 to detect anomalies in the performance and/or operation of the respective robots 102, 104, 106.

For example, as illustrated in FIG. 1, a sensor 112 is coupled to the first robot 102. The sensor 112 measures vibrations and/or movement(s) of the first robot 102 during operation and outputs signals (sometimes referred to as vibration signals) representative of the vibrations of the first robot 102. In some examples, the sensor 112 is an accelerometer, such as triaxial microelectromechanical systems (MEMS) accelerometer. In such an example, the sensor 112 obtains vibration or movement data in the X, Y, and Z directions as the first robot 102 moves. As illustrated in FIG. 1, the sensor 112 transmits (e.g., over a wired or wireless connect) the vibration signal(s) (labeled first sensor data) to the robot health monitor 110, which analyzes the vibration signal(s) to detect anomalies in the vibration(s) and/or frequency(ies) of the vibration(s) of the first robot 102.

In the illustrated example, the sensor 112 is disposed at or near an elbow 114 (e.g., a rotatable joint between a first arm portion and a second arm portion) of the first robot 102. However, in other examples, the sensor 112 may be disposed in other locations on the first robot 102 (e.g., on a shoulder of the first robot 102, near an end-effector (e.g., a tool) of the first robot 102, etc.). Further, in other examples, more than one sensor may be coupled to the first robot 102. The one or more sensor(s) may be the same type of sensor or different types of sensors.

In the illustrated example, one or more sensors (e.g., accelerometers) are similarly coupled to the second and third robots 104, 106 to measure vibrations and transmit sensor data (vibration signal(s)) to the robot health monitor 110. To avoid redundancy, a description of the sensor data retrieval and analysis for the second and third robots 104, 106 is not described in detail. Instead, it is understood that any of the example aspects disclosed herein in connection with the first robot 102, the sensor 112, and/or the analysis of the first sensor data likewise apply to the second and third robots 104, 106 and their respective sensors and sensor data.

The robot health monitor 110 analyzes the vibration signal(s) from the sensor 112 to detect any anomalies indicative of potential robot malfunction. As mentioned above, even the slightest change in the operation of the first robot 102 (e.g., a small vibration caused by a worn belt or bearing) can have detrimental effects on the wafer production process. If an anomaly is detected (e.g., a larger than normal vibration), the robot health monitor 110 outputs an alert or notification. In some examples, the robot health monitor 110 extracts one or more features from the vibration signal(s). In some examples, the extracted features include time domain features of the signals and/or frequency domain features of the signals.

In some examples, if an extracted feature satisfies a threshold (e.g., falls outside of a standard deviation), the robot health monitor 110 transmits an alert/notification and/or the feature (or data representative of the feature) over a network 116 to an electronic device 118 (referred to herein as a technician device 118). In the illustrated example, the technician device 118 is operated by a technician 120 of the manufacturing facility 101. The network 116 may be, for example, a wireless network in the manufacturing facility 101 (e.g., within or outside of a firewall 121). The technician device 118 may be an electronic device within the manufacturing facility 101 (e.g., a computer in a control room) or an electronic device that is remote from the manufacturing facility (e.g., a home computer). For example, the technician 120 may access the data in a remote location via a virtual private network (VPN) connection. The technician device 118 may be any mobile or non-mobile electronic device, such as a tablet, a personal computer, a laptop computer, a phone (e.g., a smart phone), a computer in a control room, and/or any other electronic device that can present the alert/notification to the technician 120 (e.g., via a display screen, a speaker, etc.). While in this example the user or person is referred to as a technician, it is understood that the technician 120 can represent any person or group of persons associated with the manufacturing facility 101 (e.g., an employee, a contractor, an outside vendor, etc.).

In some examples, the robot health monitor 110 is disposed near one or more of the robots 102, 104, 106. This proximity reduces delay in the data transmission and analysis. For example, the robot health monitor 110 may be located in the clean room 108 with the robots 102, 104, 106. However, in other examples, the robot health monitor 110 may be disposed outside of the clean room 108, and the robots 102, 104, 106 may transmit data over a wired or wireless network to the robot health monitor 110. The example robot health monitor 110 may be implemented on any type of computing device, such as a controller, a processor, an application-specific integrated circuit (ASIC), a personal computer, a laptop, a tablet, a phone (e.g., a smart phone), and/or any other electronic device.

In some examples, when the robot health monitor 110 detects an outlier value in one of the feature(s) of the vibration signals, the robot health monitor 110 transmits, over the network 116, the feature value (or a subset thereof) to a fault classifier 122. The fault classifier 122 performs a multi-variable analysis on the features to classify the type(s) of fault(s) that occurred based on the analysis. The multi-variable analysis may be a detailed mathematical and/or pattern recognition process that analyzes multiple ones of the features (e.g., cross-analyzes four features of the vibration signal(s)) to match the features under analysis against features expected for known defects.

In some examples, the fault classifier 122 analyzes the outlier feature(s), along with other feature(s) that are not outliers, to determine whether the outlier feature is a false alarm or false positive. If the fault classifier 122 identifies an outlier feature as a false alarm, the fault classifier 122 may notify the technician 120. For example, the fault classifier 122 may transmit a message (e.g., an email, a short message service (SMS) message, etc.), over the network 116, to the technician device 118 indicating the earlier alert (from the robot health monitor 110) is or may have been a false alarm. In other examples, the fault classifier 122 may prevent the transmission of the original alert/notification from the robot health monitor 110 altogether. Additionally or alternatively, the fault classifier 122 may identify the type of fault of the robot based on the multi-variable analysis, as disclosed in further detail herein. For example, the fault type (e.g., faulty belt, faulty bearing, etc.) may be communicated to the technician device 118 so that the technician 120 can repair, replace, and/or take another appropriate course of action in response to the alert.

In some examples, the fault classifier 122 is implemented on a cloud-based computing device (e.g., a server, a virtual machine (VM), etc.) that communicates with the robot health monitor 110 and/or the technician device 118 over the network 116. In some examples, the fault classifier 122 is located within the manufacturing facility 101. For example, the fault classifier 122 may be local to or even part of the robot health monitor 110. As such, the fault classifier 122 may be within or outside of the firewall 121 of the manufacturing facility 101. Therefore, the fault classifier 122 may be remote from the manufacturing facility 101. In some examples, depending on the security settings of the manufacturer, the fault classification information may be accessible (e.g., over the internet) by one or more outside (third-party) manufacturers or service providers (e.g., a robot servicing company).

In some examples, performing the vibration signal analysis (e.g., the feature extraction, outlier detection, and notification) at the robot health monitor 110 reduces costly data transmission that may otherwise be needed to transmit a high amount of data outside of the manufacturing facility 101 (e.g., to a remote data processing server). Also, by performing the vibration signal analysis with the robot health monitor 110 close to the robots 102-106, the reaction time for generating an alert is faster than would be with analyzing the vibration signal(s) outside of the manufacturing facility 101. For example, the robot health monitor 110 may analyze thousands of data points (e.g., samples from the vibration signal(s)) rapidly and generate alerts (for immediate attention), whereas only a few data points (e.g., the values of the extracted features) may be transmitted to the fault classifier 122 for further analysis to supplement the alerts generated by the robot health monitor 110. Thus, the amount of data to be transmitted is reduced (e.g., minimized) and the effect on bandwidth and processing time is reduced (e.g., minimized). In some examples, the robot health monitor 110 generates an immediate alert if any one of the extracted features satisfies the first threshold (identified above for detecting outliers) by more than a second threshold. The fault classifier 122 performs a more complex multi-variable analysis than the robot health monitor 110. The multi-variable analysis analyzes multiple features to supplement the fault determination. Further, by gathering and analyzing the raw sensor data (the vibration signal(s)) at the manufacturing facility 101, security and privacy issues are alleviated, because only the extracted feature information may be sent outside of the manufacturing facility 101, whereas the raw sensor data remains with the robot health monitor 110 in the manufacturing facility 101.

While in the illustrated example, the robot health monitor 110, the technician device 118, and the fault classifier 122 are implemented on separate computing devices, in other examples, any of the robot health monitor 110, the technician device 118, and/or the fault classifier 122 may be implemented by the same computing device. For example, the robot health monitor 110 may be implemented by the technician device 120 (e.g., on a computer in a control room of the manufacturing facility 101).

Figure 2:
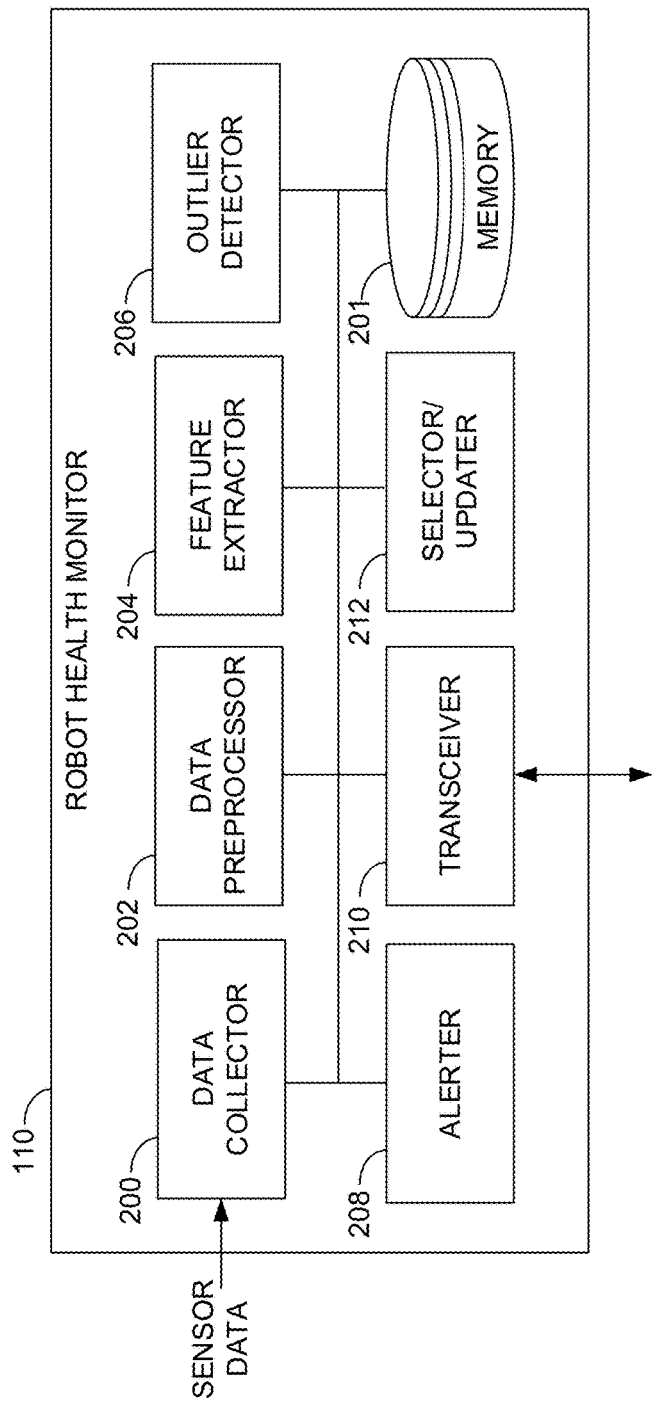
FIG. 2 is a block diagram of an example implementation of an example robot health monitor of the robot health monitoring system of FIG. 1.

FIG. 2 is a block diagram of an example implementation of the robot health monitor 110 of FIG. 1. In the illustrated example, the robot health monitor 110 includes a data collector 200 to receive sensor data (the vibration signal(s)) from the sensor 112. The data collector 200 may implement any past, present, or future communication protocol to receive data from and/or otherwise communicate with the sensor 112. In some examples, a communication protocol is selected based on application/type of data being received (e.g., a slower communication protocol may not be appropriate for the oil/gas industry where real time requirements are relatively strict), tolerance for latency and/or quality of service (QoS). Example communication protocols include a Message Queuing Telemetry Transport (MQTT) protocol, a Constrained Application Protocol (CoAP), an Advanced Message Queuing Protocol (AMQP), a Data Distribution Service (DDS) protocol, and/or a Hypertext Transfer Protocol (HTTP). In some examples, the sensor data (e.g., raw sensor data) received by the robot health monitor 110 is stored in a memory 201 of the robot health monitor 110. Additionally, the data collector 200 may be directly or indirectly implemented by a Software Development Kit (SDK) provided by the manufacturer or vendor of the sensor 112, which enables the robot health monitor 110 to establish a link, configure the sensor 112 (and/or a base), and/or otherwise obtain sensor data from the sensor 112. In some examples, the sensor 112 is a wireless sensor, and the sensor data (vibration signal(s)) are sent to a base (e.g., a hub, an edge gateway, local server, etc.), which then transmits the sensor data to the robot health monitor 110. In some such examples, the base may aggregate and transmit data from multiple sensors.

In the illustrated example, the robot health monitor 110 includes a data preprocessor 202 that performs one or more preprocessing operations on the vibrations signal(s) received by the data collector 200. In some examples, the vibration signal(s) are in the time domain (e.g., are represented by time series data). In some examples, the data preprocessor 202 includes one or more converters to convert the vibration signal(s) from time domain into the frequency domain using any past, present, or future technique such as a Fast Fourier Transform (FFT). When so transformed, the energy in various frequencies present in the signal is represented by the amplitudes of the values present in the respective bins corresponding to those frequencies. In some examples, the FFT is set to operate on 1024 data samples and to use a 50% sliding overlap window (e.g., each window includes 512 new samples and 512 samples from the prior FFT computation). An example sensor that may implement the sensor 112 may have a measurement range of +/−2 g (acceleration due to gravity=9.8 meters per second squared ($m/s^2$)) standard, an accelerometer bandwidth of 0 hertz (Hz)-500 Hz, an accuracy of 10 milli-g (mg), a resolution of 12 bit, and a continuous sampling rate of 512 Hz. With a sampling rate of 512 Hz, for example, only frequencies up to about half of the sampling rate can be measured. In other examples, other types of sensors having other parameters may be implemented. Further, in other examples, the sampling rate, the number of samples, and/or the overlap between windows may be different. In some examples, the data preprocessor 202 includes one or more filters to reduce noise in the data, an analog-to-digital converter, and/or other signal condition devices.

In the illustrated example of FIG. 2, the robot health monitor 110 includes a feature extractor 204 that extracts one or more features from the preprocessed vibration signal (s) output by the data preprocessor 202. The feature(s) may be time domain features and/or frequency domain features. In some examples, the feature extractor 204 extracts the one or more features for data samples occurring within a window of time (e.g., a one second window, a two second window, etc.). In other example, the feature extractor 204 extracts one or more features for every fixed number of data points (e.g., every 1024 data points). The extracted feature(s) are then compared to one or more threshold(s) to identify outliers to thereby detect whether a defect or fault has occurred in the robot 102 generating the vibration signal(s).

In some examples, features may be mathematical moments of the data. An example feature that may be extracted from the preprocessed vibration signal(s) by the feature extractor 204 is median frequency. Median frequency is a measure of the skewness, the third moment, in a power spectrum represented in the frequency domain. The median frequency of a window of data samples, for example, is the middle frequency of an ordered set of frequency values observed in the window. If there is an odd number of frequencies, the median frequency is the middle frequency number. If there is an even number of frequencies, the median frequency is the mean of the two central frequency numbers. As used herein, the median frequency is defined as the frequency that divides the power spectrum into two equal parts and may be obtained using Equation 1 below.

$$\sum_{i=1}^{m} I_i = \sum_{i=m+1}^{n} I_i \qquad \text{Equation 1}$$

In Equation 1, n is the total number of frequency bins (e.g., 0.5*512=256) obtained using an FFT, $I_i$ is the amplitude or intensity of the spectrum at the i-th bin and the median frequency (mf)=f(m) (i.e., frequency of spectrum at m-th bin). In other examples, other calculations may be used to determine the median frequency for a window or set of data. In some examples, it is advantageous to use a median frequency feature (as compared to a single frequency feature) because the first robot 102 is performing a plurality of operations or movements over time. Therefore, the median frequency takes into account these movements. In some examples, vibrations having a relatively high amplitude and relatively lower median frequency may be more indicative of a robot potentially malfunctioning than a vibration having a relatively low amplitude and relatively high median frequency.

Another example frequency domain feature that may be extracted by the feature extractor 204 is the spectral energy of the preprocessed vibration signal(s). Spectral energy may be determined using Equation 2 below.

$$\text{Spectral energy} == \left(\frac{1}{n}\right) * \sum_{i=1}^{n} I_i^2 \qquad \text{Equation 2}$$

In some examples, vibrations having higher spectral energy may be more indicative of the robot potentially malfunctioning than a vibration having lower spectral energy.

Another example feature that may be extracted from the preprocessed vibration signal(s) by the feature extractor 204 is root mean square (RMS), which is a time domain feature. RMS is the square root of the arithmetic mean of the squares of the values in a sample. For example, in the case of a set of n values {x1, x2, . . . , xn} the RMS ($x_{rms}$) may be determined using Equation 3 below:

$$x_{rms} = \sum_{i=1}^{n} \sqrt{\frac{1}{n}(x_i^2)} \qquad \text{Equation 3}$$

In the above equation, each value x may correspond to, for example, the amplitude of the vibration signal(s) at a point in time.

Another example time domain feature that may be extracted from the preprocessed vibration signal(s) by the feature extractor 204 is variance. Variance (e.g., the second moment of the data) is a physical quantity that informally measures how far a set of data/numbers are spread out from the mean of the data/numbers. The mean (e.g., the first moment of the data) is the average of the quadratic summation of the data/numbers, which sums the squared value of difference value of each data and the mean. For example, variance of a set of n equally likely values ($x_1 \ldots x_n$) can be written using Equation 4 below:

$$\text{Var}(X) = \frac{1}{n}\sum_{i=1}^{n}(x_i - \mu)^2 \qquad \text{Equation 4}$$

In the expression above, x is a discrete measurement and $\mu$ is the expected value. $\mu$ can be determined using Equation 5 below:

$$\mu = \frac{1}{n}\sum_{i=1}^{n} x_i \qquad \text{Equation 5}$$

In some examples, a vibration having a higher variance may be more indicative of a potential robot defect than a vibration having a lower variance.

Further, in addition to or as an alternative to any of the features discussed above, the feature extractor 204 may extract one or more other features from the preprocessed vibration signal(s), such as the mean, the minimum, the maximum, the standard deviation, the median, the mean of the energy, the standard deviation of the energy, the mean of the mean frequency, the mean of the median frequency, the standard deviation of the median frequency, the mean of the average energy, the standard deviation of the average energy, the mean of the average mean frequency, the standard deviation of the average mean frequency, the mean of the average median frequency, and/or the standard deviation of the average median frequency of sensor data values. One or more of the features may be determined for vibrations in the x-axis, the y-axis, and/or the z-axis. In other words, the feature(s) of the preprocessed vibration signal(s) collected by the sensor(s) may be calculated for each axis of interest. In some examples, prior to sending the feature(s) to the outlier detector 206, the feature extractor 204 normalizes the feature(s) to enable the data to be in a structured and/or searchable format (e.g., a model, a framework, a structured model, a structured framework, etc.).

In the illustrated example of FIG. 2, the robot health monitor 110 includes an outlier detector 206. The outlier detector 206 of this example uses one or more outlier detection processes to identify features that are outliers. For example, the outlier detector 206 may compare a feature under analysis to a threshold. If the feature satisfies the threshold, the feature is identified as an outlier (an anomaly). In some examples, the threshold is based on one or more previous measurements (e.g., a mean of features that occurred in one or more previous time windows or data sets). For example, the outlier detector 206 may compare a current feature to a mathematical combination of plurality of previous features (e.g., an average of values of the same type of features) over a period a time, such as 60 days. Alternatively, the threshold may be a multiple of a standard deviation of such an average or mean. If the current feature is outside of the threshold based on data collected in the previous 60 days, then the current feature is identified as an outlier. However, if the current feature does not satisfy the threshold (e.g., falls within a multiple of the standard deviation of the average of the corresponding features collected in the previous 60 days), then the current feature is not identified as an outlier. Thus, the example outlier detector 206 can determine when a change in the vibration of the first robot 102 has occurred, which may be indicative of a malfunction of the first robot 102. In some examples, the threshold is 1.5 times the standard deviation. In other examples, the threshold may be larger or smaller multiples of the standard deviation. Further, in other examples, the current measurements may be compared to measurements from a smaller or larger set (e.g., a shorter (e.g., 24 hours) or longer window (e.g., 90 days)). In some examples, the window size for measurement and comparison may be set or established by a user (e.g., the technician 120).

In some examples, such as with a triaxial accelerometer that measures acceleration in the X, Y, and Z directions, the above analysis may be performed for the vibration signals collected for each axis. Further, this analysis may be performed repeatedly for each of the desired features of the vibration signal(s). As such, the extracted features are constantly being compared to a plurality of previous values of the features (e.g., a rolling average or mean of historical data is used). In some examples, only one feature is used. In other examples, multiple features are used. With multiple features, an outlier may occur in one feature and not in the other features, or multiple outliers may occur in multiple ones of the features simultaneously (e.g., the median frequency (first feature) and the amplitude of vibration (second feature) may both change when a major malfunction occurs). In some examples, each of the extracted features and/or the outlier features flagged by the outlier detector 206 are saved in the memory 201.

In some examples, to determine whether a feature satisfies (e.g. exceeds) a threshold, the outlier detector 206 may implement a statistical process control (SPC) and/or a univariate outlier detection method. The SPC considers the case where a univariable stream of measurements represents a stochastic process. For example, the sensor 112 may provide a univariable stream of data representing a stochastic process. Outliers within the data may be detected by identifying observation points that are abnormally distant from other observation points. Outlier detection methods aim to identify observation points that are abnormally distinct from single observation points. This detection method can be parametric (i.e., assumes a known underlying distribution for the data set, and defines an outlier region that if an observation belongs to the region, it is marked as an outlier). In some examples, the univariate outlier detection method or algorithm takes in an array of data for outlier detection and an initialization procedure for setting initial parameters of the algorithm, the vector of means, vectors of standard deviations, and vector of limits that define the outlier region, which is the z-score given in units of how many standard deviations it is from the mean. In other words, the outlier detection algorithm takes in the array of data (e.g., vector of means, standard deviation, etc.) and an array of z-scores that represents the threshold (e.g., the z-score indicates how many standard deviations an element is from the mean). In some such examples, the output of the algorithm is an n=p table corresponding to each data point/input of 0s and 1s. A value of 0 in the position (i,j) indicates an outlier in the i-th observation of the j-th feature.

In the illustrated example of FIG. 2, the robot health monitor 110 includes an alerter 208 that outputs an alert or notification if an outlier in one of the feature(s) is detected by the outlier detector 206. In the illustrated example, the robot health monitor 110 includes a transceiver 210, which operates as a receiver and a transmitter. The transceiver 210 may be, for example, a wireless transceiver (e.g., WiFi, Bluetooth®, cellular, etc.) to communicate over the network 116 (FIG. 1). The alerter 208 may transmit an alert or notification, via the transceiver 210, over the network 116 to the technician device 118, for example. The alert may include the outlier feature, the value of the feature, and/or any other information associated with the vibration signal. In some examples, the rules of the alerter 208 may be configured by a user, such as the technician 120. For example, the technician 120 may communicate with the robot health monitor 110, over the network 116, to reconfigure the rules for when an alert is generated. In some examples, the alerter 208 detects false positives and is programmed to not generate a false alarm or notification if a false positive is detected. The alerter 208 may also transmit, via the transceiver 210, the notification and/or any of the data from the analysis (e.g., the outlier feature(s)) to the fault classifier 122 (FIG. 1) for further analysis.

In some examples, the robot health monitor 110 includes a selector/updater 212 that selects certain ones of the features to be analyzed. In some examples, the selector/updater 212 selects the feature(s) based on input from a user, such as the technician 120. For example, the technician device 118 may display a list of possible features to the technician 120, and the technician 120 may select one or more of the features to be analyzed. The technician device 118 may instruct the selector/updater 212 (e.g., over the network 116) to configure the feature extractor 204 to extract the selected feature(s). Further, new features may be sent by the technician device 118, for example, and uploaded to the feature extractor 204. Therefore, in some examples, the features to be analyzed can be changed and/or replaced without having to physically alter the hardware in the clean room 108 (FIG. 1).

In some examples, the selector/updater 212 implements a machine learning algorithm that continuously analyzes the outcome of the alert/notification and updates to learn and select features that are more likely to be indicative of an actual fault, rather than a false alarm. Thus, in some examples, the features may be dynamically selected and/or updated by the learning algorithm as robot(s) are monitored over time. This should result in fewer false alarms and missed events over time. Further, in some examples, a user may configure one or more of the criteria (e.g., the threshold) for detecting an outlier.

Figure 3:
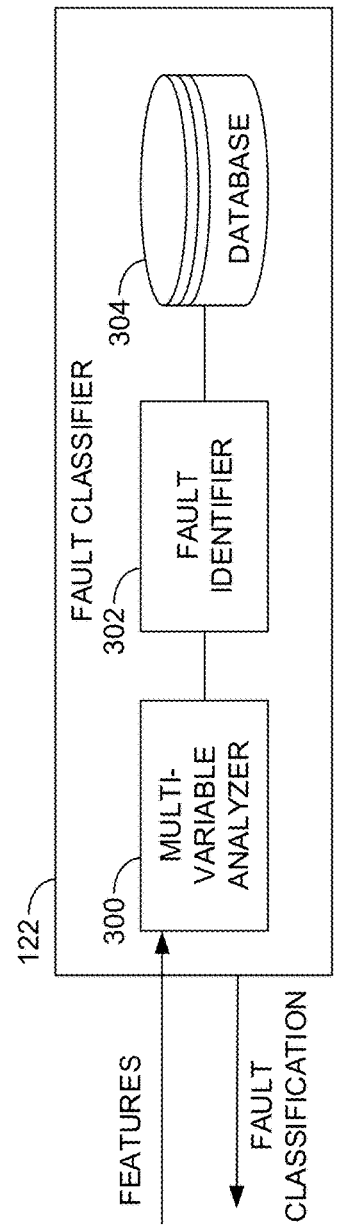
FIG. 3 is a block diagram of an example implementation of an example fault classifier of the robot health monitoring system of FIG. 1.

FIG. 3 is a block diagram of an example implementation of the fault classifier 122 of FIG. 1. In the illustrated example, the fault classifier 122 includes a multi-variable analyzer 300, a fault identifier 302, and a database 304. The multi-variable analyzer 300 receives the feature(s) (including the outlier feature(s)) from the robot health monitor 110 and performs a multi-variable analysis. The fault identifier 302 identifies or classifies the type(s) of fault(s) of the robot based on the results of the multi-variable analysis. By analyzing multiple features, the fault identifier 302 can more accurately identify false alarms. For example, if considering one feature alone (e.g., median frequency), the solution may be less accurate, but considering a combination of features (e.g., median frequency and average energy, such as discussed in further detail in connection with FIG. 6), a more accurate assessment can be achieved. In some examples, the database 304 includes a table of possible faults correlated to certain feature combinations. The fault identifier 302 may use the table to identify the type(s) of fault(s). Example faults that may be identified or classified include a bearing fault (which can be an inner race fault, an outer race fault, a rotor fault, etc.), a belt fault, a motor fault, a loose mechanical joint due to wear and tear, an irregular movement due to a mechanical blockage, an imbalance of the robot structure, a rapid point-to-point motion and/or an abrupt change in acceleration, a tight clearance in a wafer handling chamber, etc. In some examples, the fault identifier 302 identifies the outlier measurement as a false alarm. If so, the fault classifier 122 may transmit a notification to the technician device 118 to alert the technician 120 that the previous alert or notification (from the robot health monitor 110) may have been a false alarm. In some examples, after a repair is made on a robot, the actual cause of the fault (e.g., a loose belt) may be uploaded to the fault classifier 122, which can then use the information in future predictions.

Figure 4:
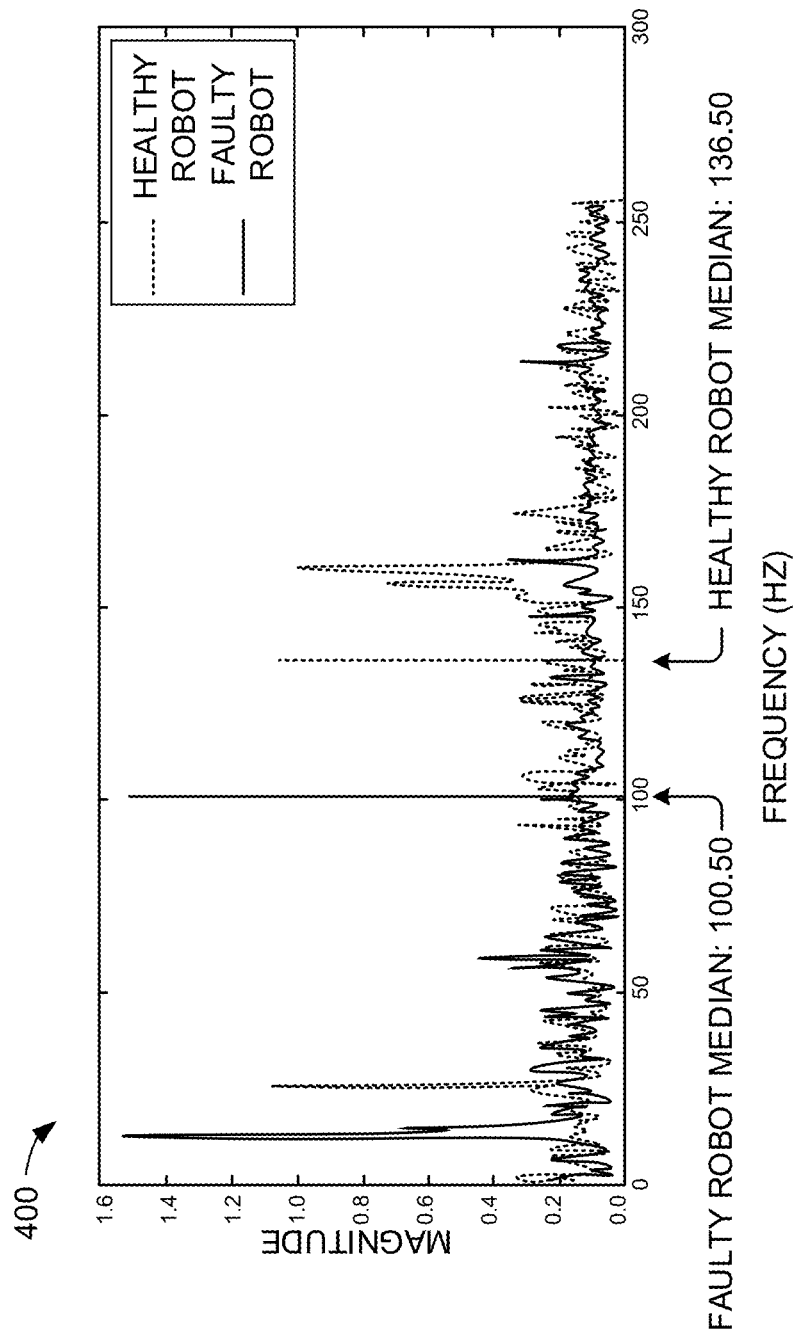
FIG. 4 is a graph showing example frequency data taken by a sensor on a healthy robot and a faulty robot.

FIG. 4 is a graph 400 showing example median frequency values of sensor data obtained from a healthy robot and a faulty robot. The sensor data may be from the same robot, for example, taken before and after a repair on the robot (e.g., the first robot 102). In the example graph 400, the X axis represents the frequencies in the vibration signal(s) and the Y axis represents magnitude (or amplitude) of the signal(s) at each frequency over a window of data. The median frequency, as discussed above, is a frequency domain feature that may be determined by the feature extractor 204. The example graph 400 shows the faulty robot (e.g., pre-repair) median frequency is about 100.50 Hz, while the healthy robot (e.g., post repair) median frequency is about 136.50 Hz. Thus, there is a noticeable difference in the faulty robot signal, which has much lower frequency components (e.g., due to wobble motion in the corresponding robot) than the healthy robot median frequency. As such, in some examples, repair of the robot causes the median frequency to increase.

Figure 5:
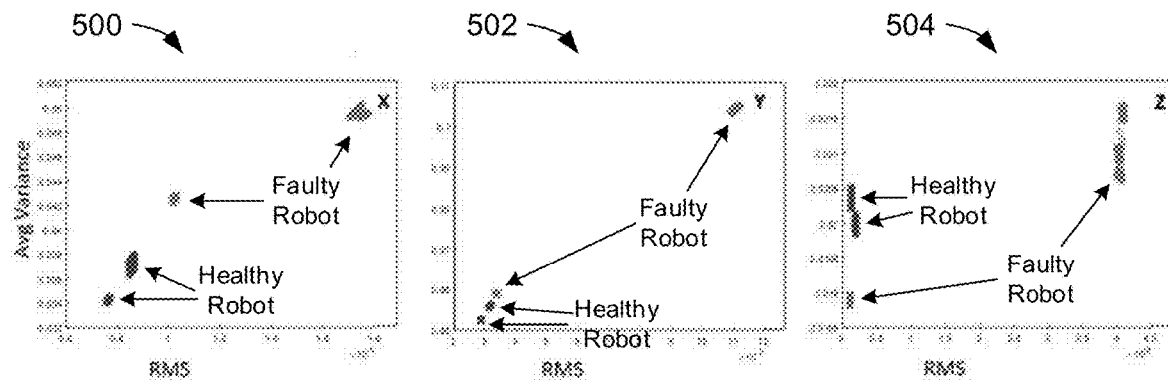
FIG. 5 are graphs depicting example measurements taken by a sensor on a healthy robot and a faulty robot and shown in the time domain for X, Y, and Z direction vibrations.

FIG. 5 shows graphs 500, 502, 504 of example RMS v. example average variance (time domain features) for data taken from a healthy robot and data taken from a faulty robot for each of the X, Y, and Z axes. In particular, graph 500 corresponds to vibration in the X direction (axis) movements, graph 502 corresponds to vibration in the Y direction (axis) movements, and graph 504 corresponds to vibration in the Z direction (axis) movements. Together, FIG. 5 represents vibrations in three directions as measured at a same location on a healthy robot and on a malfunctioning robot. The data clusters for the healthy robot and the faulty robot are labeled in each of the graphs 500, 502, 504. The vibration of the faulty robot may be related to the bearing(s), for example. As mentioned above, the sensor 112 may be a triaxial accelerometer, such as a triaxial MEMS accelerometer, that obtains data for each of the three axes. In some examples, using a triaxial accelerometer produces better measurements that can be used to identify faults in a robot compared to other types of sensors. In particular, a triaxial accelerometer is a non-invasive type of sensor and can be used to detect multiple types of failures (whereas other types of sensors may only be able to pick one type of failure). As can be seen in FIG. 5, the features in the vibration signal(s) from the faulty robot are markedly different from the features from the healthy robot. Thus, even small defects in a robot can produce noticeable effects that can be measured by the accelerometer, and which can be used to distinguish between a properly operating robot and a faulty robot.

Figure 6:
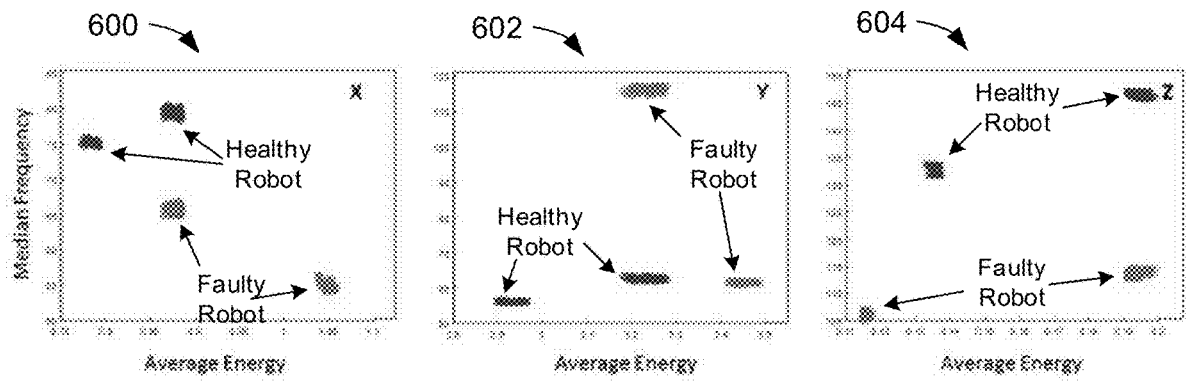
FIG. 6 are graphs depicting example measurements taken by a sensor on a healthy robot and a faulty robot and shown in the frequency domain for X, Y, and Z direction vibrations.

Similar to the graphs of FIG. 5, FIG. 6 shows graphs 600, 602, 604 of example average energy v. example median frequency (frequency domain features) for data taken from a healthy robot and data taken from a faulty robot for each of the X, Y, and Z axes. Together, FIG. 6 represents vibrations in three directions as measured at a same location on a healthy robot and on a malfunctioning robot. In particular, graph 600 corresponds to vibrations in the X direction (axis) movements, graph 602 corresponds to vibrations in the Y direction (axis) movements, and graph 604 corresponds to vibrations in the Z direction (axis) movements. The data clusters for the healthy robot and the faulty robot are labeled in each of the graphs 600, 602, 604. Similar to the graphs in FIG. 5, the graphs in FIG. 6 show noticeable differences in the features of the vibration signal(s) between a healthy robot and a faulty robot. As such, these features can be used to distinguish between a properly operating robot and a faulty robot.

While the example robot health monitoring system 100 is described above in connection with a semiconductor wafer manufacturing facility, the example robot health monitoring system 100 may be similarly implemented with any other type of manufacturing facility or process having one or more robots or machines. For example, the robot health monitoring system 100 may be implemented with manufacturing facilities for such things as vehicles, cellphones, pharmaceuticals, chemicals, biotech products, oil and gas industries, etc.

While an example manner of implementing the robot health monitor 110 is illustrated in FIG. 2, one or more of the elements, processes and/or devices illustrated in FIG. 2 may be combined, divided, re-arranged, omitted, eliminated and/or implemented in any other way. Further, the example data collector 200, the example data preprocessor 202, the example feature extractor 204, the example outlier detector 206, the example alerter 208, the example selector/updater 212, and/or, more generally, the example robot health monitor 110 of FIG. 2 may be implemented by hardware, software, firmware and/or any combination of hardware, software and/or firmware. Thus, for example, any of the example data collector 200, the example data preprocessor 202, the example feature extractor 204, the example outlier detector 206, the example alerter 208, the example selector/updater 212, and/or, more generally, the example robot health monitor 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 200, the example data preprocessor 202, the example feature extractor 204, the example outlier detector 206, the example alerter 208, and/or the example selector/updater 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example robot health monitor 110 of FIG. 2 may include one or more elements, processes and/or devices in addition to, or instead of, those illustrated in FIG. 2, and/or may include more than one of any or all of the illustrated elements, processes and devices.

Figure 7:
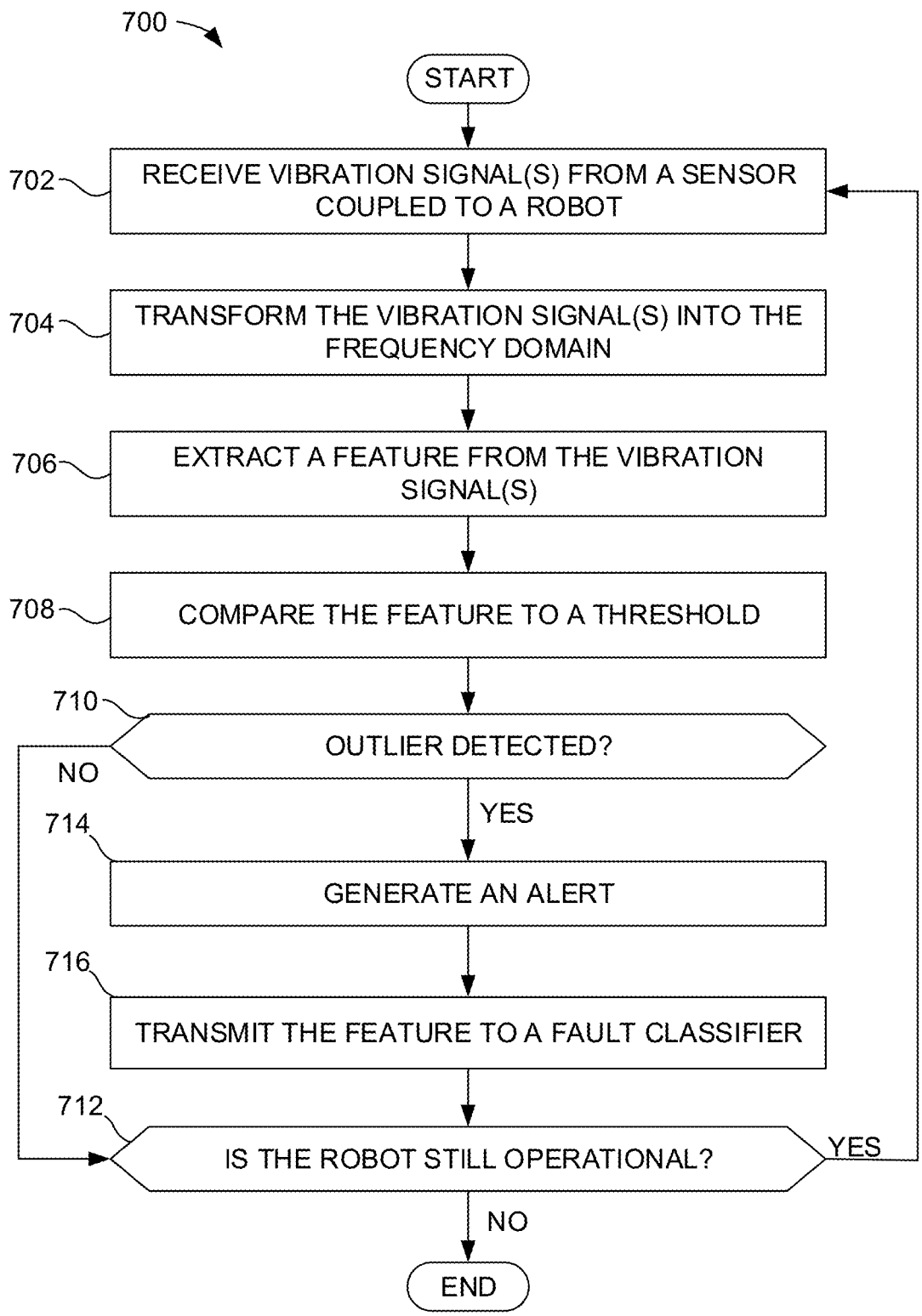
FIG. 7 is a flowchart representative of example machine readable instructions that may be executed to implement the example robot health monitor of FIGS. 1 and/or 2.

A flowchart representative of example machine readable instructions for implementing the robot health monitor 110 is shown in FIG. 7. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 9, many other methods of implementing the example robot health monitor 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 7 is a flowchart 700 representative of example machine readable instructions that may be executed by a processor to implement the robot health monitor 110 of FIGS. 1 and 2. The example process of FIG. 7 is described in connection with sensor data (vibration signal(s)) obtained by the sensor 112 on the first robot 102 of FIG. 1. However, it is understood that the example process of FIG. 7 may be similarly performed for data collected by multiple sensors on the same or different ones of the robots 102-106, simultaneously or in sequence. Further, while the example process of FIG. 7 is described in connection with one type of feature, it understood that the example process may be similarly performed using other types of features.

At block 702, the example data collector 200 receives the vibration signal(s) from the sensor 112, which is coupled to the first robot 102. The sensor 112 may be, for example, a triaxial accelerometer. In some such examples, the vibration signal(s) include signals representative of vibration or movement in the X, Y, and/or Z directions. In some examples, the sensor data is to be transformed into the frequency domain (e.g., depending on the type of feature to be extracted). Therefore, at block 704, the example data preprocessor 202 may transform the vibration signal(s) into the frequency domain. Additionally or alternatively, the data preprocessor 202 may filter the vibration signal(s) to remove noise and/or perform other signal conditions processes (e.g., analog-to-digital conversion).

At block 706, the feature extractor 204 extracts a feature from a portion of the preprocessed vibration signal(s) (e.g., for one or more of the axis signals). The feature may be, for example, median frequency, spectral energy, RMS, or variance. Additionally or alternatively, the feature may be another type of feature of the vibration signal(s) in the time domain or frequency domain. Therefore, in this example, the feature extractor 204 provides means for extracting a feature of a vibration signal.

At block 708, the outlier detector 206 compares the feature calculated at block 708 to a threshold for the feature. In some examples, the threshold is based one or more previous values or measures of the same type of feature occurring over a time window. For example, the outlier detector 206 may determine whether the feature (as calculated at block 706) is within or outside a multiple of a standard deviation (e.g., 1, 1.5, 2, 2.5, etc.) of the previous values of the feature over a time period (e.g., over the last 60 days). Therefore, in this example, the outlier detector 206 provides means for comparing the feature to a threshold.

At block 710, the outlier detector 206 determines whether the feature is an outlier. For example, the outlier detector 206 may determine whether the feature is an outlier measurement based on whether the feature is within or outside the threshold (e.g., a multiple of the standard deviation of the historical average or mean for the feature). If the feature is within the threshold (e.g., indicating the robot is not defective), control proceeds to block 712, where the robot health monitor 110 determines whether the first robot 102 is still being operated. If the first robot 102 is not being operated, the example process of FIG. 7 may end. If the first robot 102 is still being operated, control returns to the block 702 and the example process may be repeated. In some examples, the robot health monitor 110 may determine whether the first robot 102 is still operational based on a time since the sensor 112 generated a signal. For example, if the sensor 112 has not detected any movement for over five minutes, the robot health monitor 110 may determine the first robot is non-operational (e.g., in a sleep mode, the manufacturing facility 101 has been temporarily shut down, etc.).

Returning back to block 710, if the extracted feature satisfies (e.g., exceeds) the threshold (e.g., is outside of the multiple of the standard deviation), the outlier detector 206 may flag and/or otherwise identify the feature as an outlier. At block 714, in response to detecting an outlier, the example alerter 208 generates an alert or notification. Therefore, in this example, the alerter 208 provides means for generating an alert when the feature satisfies the threshold. The alerter 208 may transmit the alert or notification, via the transceiver 210, over the network 116 to the technician device 118, which may be used to alert the technician 120 of potential malfunction or defect in the first robot 102. Therefore, in this example, the transceiver 210 may provide means for transmitting the alert. The technician 120 may then take a course of action, such as further analyzing the data coming from the sensor 112 of the first robot 102, scheduling a service/inspection, scheduling a replacement of the first robot, etc. In some examples, in addition to or as an alternative to generating the alert, the alerter 208, at block 716, transmits (via the transceiver 210) the outlier feature to the fault classifier 122 (e.g., a cloud-based application). In some examples, the alerter 208 also transmits one or more other feature(s) corresponding to the same window to the fault classifier 122 (e.g., implemented on a cloud-based computing device). Therefore, in this example, the transceiver 210 may provide means for transmitting the feature to the fault classifier 122. The fault classifier 122 may analyze the features, an example of which is disclosed in further detail in connection with FIG. 8. At block 712, the robot health monitor 110 determines whether the first robot 102 is still operational. If the first robot 102 is not operational, the example process of FIG. 7 may end. If the first robot 102 is still operational, control returns to the block 702 and the example process may be repeated.

As explained above, while only one feature is described in connection with FIG. 7, the example process of FIG. 7 may be performed by the example robot health monitor for multiple feature at the same time, using the same window and/or different windows.

While an example manner of implementing the fault classifier 122 is illustrated in FIG. 3, one or more of the elements, processes and/or devices illustrated in FIG. 3 may be combined, divided, re-arranged, omitted, eliminated and/or implemented in any other way. Further, the example multi-variable analyzer 300, the fault identifier 302, and/or, more generally, the example fault classifier 122 of FIG. 3 may be implemented by hardware, software, firmware and/or any combination of hardware, software and/or firmware. Thus, for example, any of the example multi-variable analyzer 300, the fault identifier 302, and/or, more generally, the example fault classifier 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example multi-variable analyzer 300 and/or the fault identifier 302 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fault classifier 122 of FIG. 3 may include one or more elements, processes and/or devices in addition to, or instead of, those illustrated in FIG. 3, and/or may include more than one of any or all of the illustrated elements, processes and devices.

Figure 8:
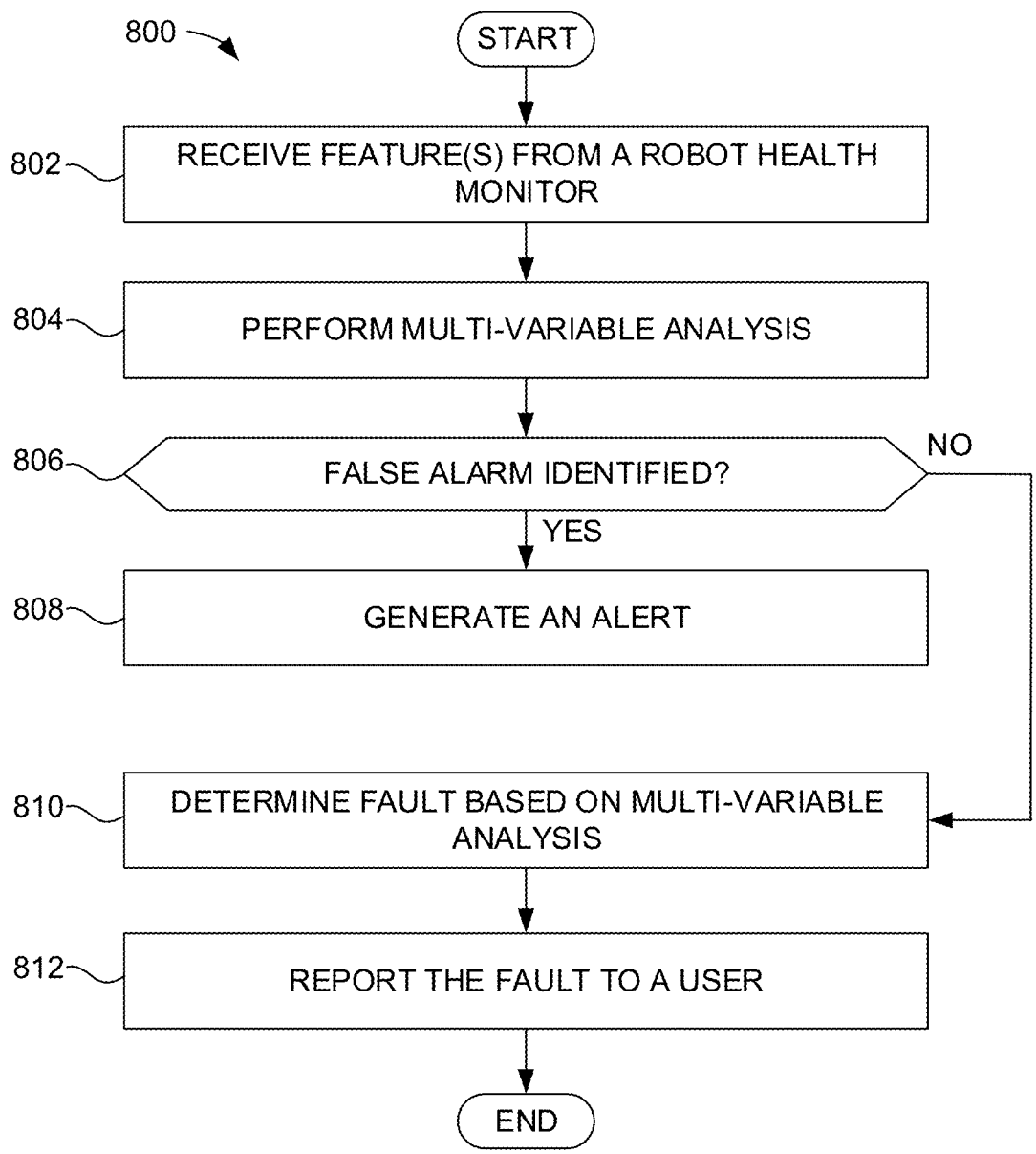
FIG. 8 is a flowchart representative of example machine readable instructions that may be executed to implement the example fault classifier of FIGS. 1 and/or 3.

A flowchart representative of example machine readable instructions for implementing the fault classifier 122 is shown in FIG. 8. In this example, the machine readable instructions comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example fault classifier 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 8 is a flowchart 800 representative of example machine readable instructions that may be executed by the fault classifier 122 of FIGS. 1 and 3. The example process is described in connection with the sensor 112 on the first robot 102. However, it is understood that the example the example process of FIG. 8 may be similarly performed for multiple sensors on the same or different ones of the robots 102-106, simultaneously or in sequence.

At block 802, the multi-variable analyzer 300 receives features and/or outlier features from the robot health monitor 110. The features may be transmitted over the network 116, for example. At block 804, the multi-variable analyzer 300 performs a multi-variable analysis on the features.

At block 806, the fault identifier 302 determines whether an outlier feature (as detected by the robot health monitor 110) is a false alarm based on the results of the multi-variable analysis (block 804). For example, certain combinations of the features may generate an outlier (if one of the features does not satisfy its threshold) but may not be indicative of a faulty robot. In some examples, the fault identifier 302 compares the features to a table or listing stored in the database 304. The table represents patterns of features and/or outlier feature(s) that have historically appeared when corresponding defects (e.g., a worn belt) are present. If the fault identifier 302 determines the outlier feature is a false alarm (e.g., the pattern of features does not match to an entry in the table), the fault identifier 302 generates an alert, at block 808, to inform the technician 120 or other user. For example, the fault identifier may transmit (e.g., over the network 116) a message to the technician 118 that the previous alert from the robot health monitor 110 is a false alarm. As such, the technician 118 may ignore the previous alert or notification.

At block 806, if the outlier feature is not identified as a false alarm, the fault identifier 302, at block 810, determines the type of fault based on the multi-variable analysis (block 804), which may be based on use of the table disclosed above. The fault identifier 302 may identify or classify the fault based on a plurality of predefine faults, such as a bearing fault, a belt fault, a motor fault, etc. At block 812, the fault identifier 302 reports the type of fault(s) to the technician 118. After block 812, the example process ends or may be begin again.

Figure 9:
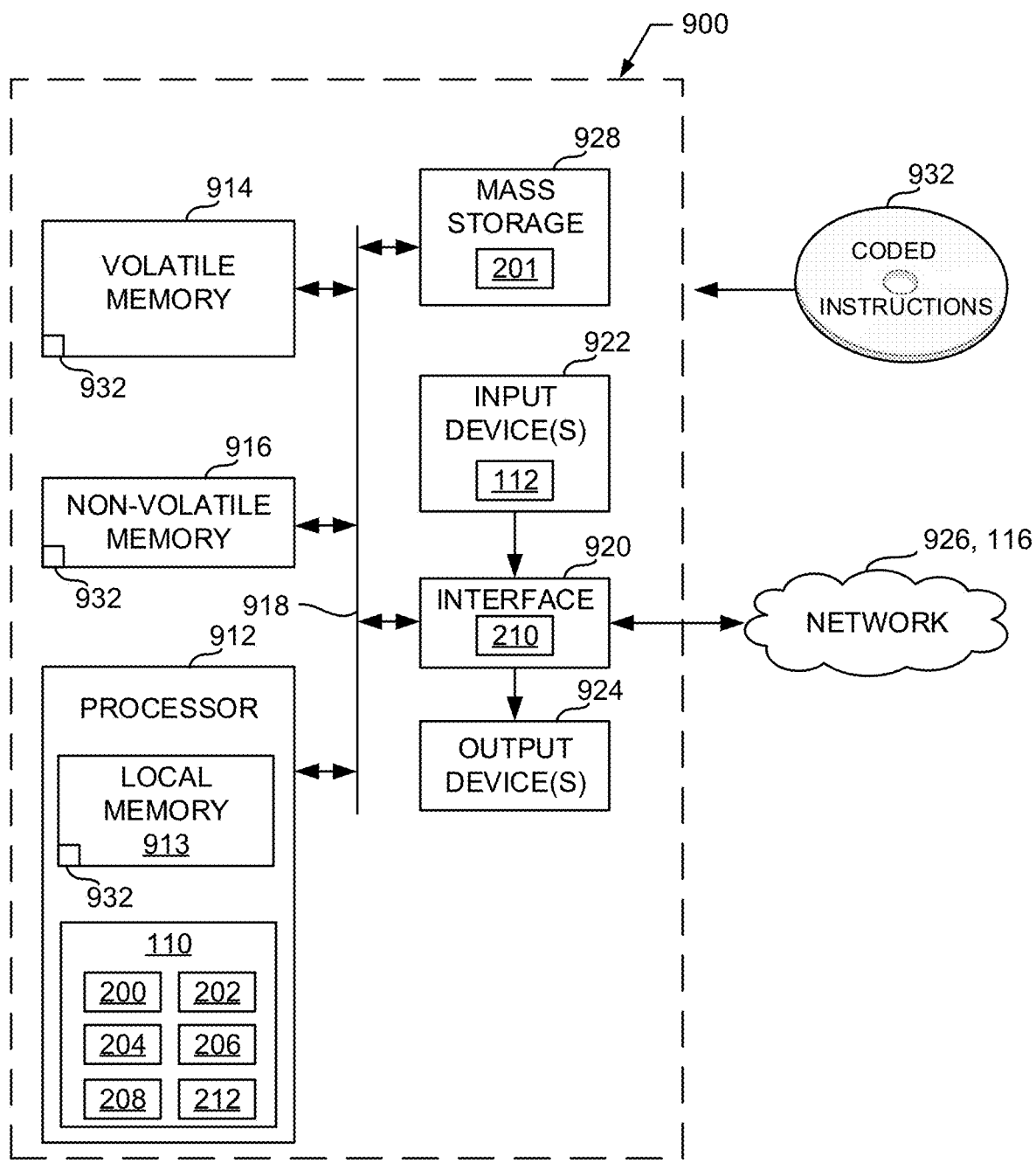
FIG. 9 is a processor platform structured to execute the example instructions of FIG. 7 to implement the example robot health monitor of FIG. 2.

FIG. 9 is a block diagram of an example processor platform 900 structured to execute the instructions of FIG. 7 to implement the robot health monitor of FIG. 2. The processor platform 900 can be, for example, a sensor controller, a server, a personal computer, a mobile device (e.g., a cell phone, a smart phone, a tablet such as an iPad™), a personal digital assistant (PDA), or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 may implement the example data collector 200, the example data preprocessor 202, the example feature extractor 204, the example outlier detector 206, the example alerter 208, the example selector/updated 212 and/or, more generally, the example robot health monitor 110.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a device and/or a user (e.g., the technician 120) to enter data and/or commands into the processor 912. In this example, the input device(s) 922 may include the sensor 112 and/or any of the other sensor(s) on the first robot 102 and/or the other robots. Additionally or alternatively, the input device(s) 922 can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output device(s) 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver (e.g., the transceiver 210), a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.). In this example, the network 926 may correspond to the network 116 (FIG. 1).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. In this example, the mass storage devices 928 may include the memory 201.

The coded instructions 932 of FIG. 7 may be stored in the mass storage device 928, in the volatile memory 914, in the non-volatile memory 916, and/or on a removable tangible computer readable storage medium such as a CD or DVD.

Figure 10:
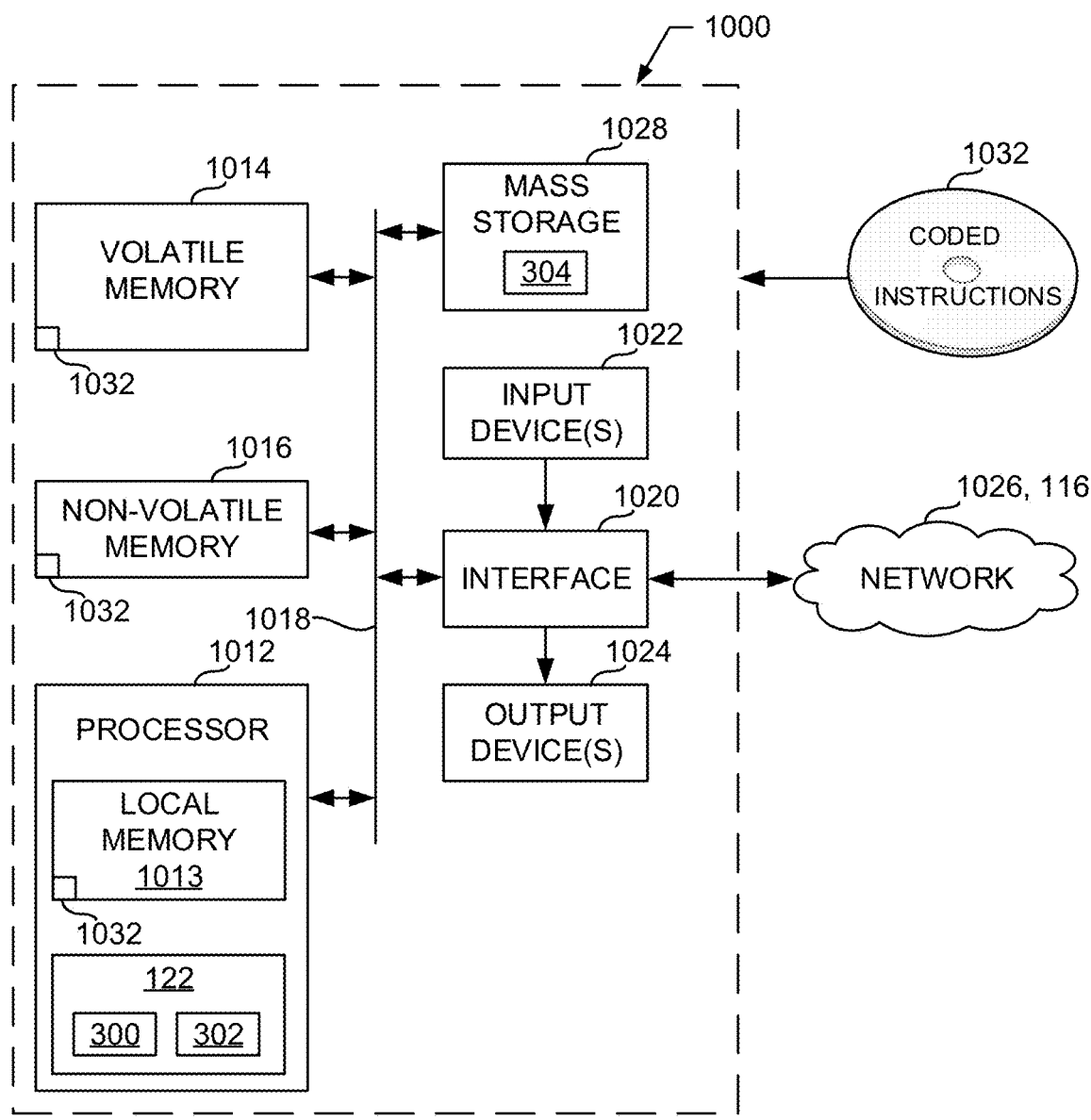
FIG. 10 is a processor platform structured to execute the example instructions of FIG. 8 to implement the example fault classifier of FIG. 3.

FIG. 10 is a block diagram of an example processor platform 1000 structured to execute the instructions of FIG. 8 to implement the fault classifier 122 of FIG. 3. The processor platform 1000 can be, for example, a server, a personal computer, a mobile device (e.g., a cell phone, a smart phone, a tablet such as an iPad™), a personal digital assistant (PDA), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device. In this example, the processor 1012 may implement the example multi-variable analyzer 300, example fault identifier 302, and/or, more generally, the example fault classifier 122.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and/or commands into the processor 1012. The input device(s) 1022 can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output device(s) 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In this example, the network 1026 may correspond to the network 116 (FIG. 1).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives. In this example, the mass storage devices 1028 may implement the example database 304.

The coded instructions 1032 of FIG. 8 may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus, systems, and articles of manufacture have been disclosed that identify potentially faulty robots in a manufacturing facility. The examples disclosed herein enable a continuous, real time or near real time monitoring of a robot to achieve early detection of potential faults. Examples disclosed herein also analyze multiple features of sensor data to minimize false alarms.

Example methods, apparatus, systems, and articles of manufacture to monitor robot health are disclosed herein. Further examples and combinations thereof include the following:

Example 1 includes a system to monitor health of a robot in a semiconductor wafer manufacturing facility. The system includes a sensor coupled to the robot, the sensor to obtain a vibration signal representative of vibration of the robot, and a health monitor. The health monitor is to extract a feature from the vibration signal, compare the feature to a threshold, and, in response to determining the feature satisfies the threshold, transmit an alert.

Example 2 includes the system of Example 1, wherein the feature is a median frequency, spectral energy, root mean square, or variance of the vibration signal.

Example 3 includes the system of Example 1, wherein the robot is disposed in a clean room of the semiconductor wafer manufacturing facility.

Example 4 includes the system of Example 3, wherein the health monitor is disposed in the clean room.

Example 5 includes the system of Example 4, wherein the health monitor is to transmit the alert to an electronic device disposed outside of the clean room.

Example 6 includes the system of Example 1, wherein the health monitor is to compare the feature to the threshold by determining whether the feature is within a multiple of a standard deviation of a mathematical combination of historical values of the feature.

Example 7 includes the system of Example 1, wherein the sensor is a triaxial microelectromechanical systems (MEMS) accelerometer.

Example 8 includes the system of Example 7, wherein the sensor is to obtain vibration data associated with movement in each of X, Y, and Z directions.

Example 9 includes the system of any of Examples 1-8, further including a fault classifier, the health monitor to transmit the feature to the fault classifier.

Example 10 includes the system of Example 9, wherein the fault classifier is to determine whether the alert is a false alarm based on a multi-variable analysis using the feature.

Example 11 includes the system of Example 9, wherein the fault classifier is to determine a type of fault associated with the feature.

Example 12 includes the system of Example 9, wherein the fault classifier is implemented on a cloud-based computing device.

Example 13 includes a method to monitor health of a robot in a semiconductor wafer manufacturing facility. The method includes extracting, by executing an instruction with at least one processor, a feature of a vibration signal obtained by a sensor coupled to the robot, comparing the feature to a threshold, and generating, by executing an instruction with the least one processor, an alert when the feature satisfies the threshold.

Example 14 includes the method of Example 13, wherein the generating the alert includes transmitting the alert over a network to an electronic device to be presented to a user.

Example 15 includes the method of any of Examples 13 or 14, wherein the comparing of the feature to the threshold includes comparing the feature to a multiple of a standard deviation of a mathematical combination of plurality of historical values of the feature.

Example 16 includes the method of any of Examples 13-15, further including communicating the feature to a fault classifier.

Example 17 includes the method of any of Examples 13-16, further including selecting, based on user input, the feature to be extracted from the vibration signal.

Example 18 includes a non-transitory machine readable storage medium comprising instructions that, when executed, cause at least one machine to at least extract a feature of a vibration signal obtained by a sensor coupled to a robot in a semiconductor wafer manufacturing facility, compare the feature to a threshold, and generate an alert when the feature satisfies the threshold.

Example 19 includes the non-transitory machine readable storage medium of Example 18, wherein the instructions, when executed, cause the at least one machine to transmit the alert over a network to an electronic device to be presented to a user.

Example 20 includes the non-transitory machine readable storage medium of any of Examples 18 or 19, wherein the instructions, when executed, cause the at least one machine to compare the feature to the threshold by comparing the feature to a multiple of a standard deviation of a mathematical combination of plurality of historical values of the feature.

Example 21 includes the non-transitory machine readable storage medium of any of Examples 18-20, wherein the instructions, when executed, cause the at least one machine to transmit the feature to a fault classifier.

Example 22 includes an apparatus including means for extracting a feature of a vibration signal obtained by a sensor coupled to a robot in a semiconductor wafer manufacturing facility, means for comparing the feature to a threshold, and means for generating an alert when the feature satisfies the threshold.

Example 23 includes the apparatus of Example 22, further including means for transmitting the alert over a network to an electronic device to be presented to a user.

Example 24 includes the apparatus of any of Examples 22 or 23, wherein the means for comparing is to compare the feature to a multiple of a standard deviation of a mathematical combination of plurality of historical values of the feature.

Example 25 includes the apparatus of any of Examples 22-24, further including means for transmitting the feature to a fault classifier.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A system to monitor health of a robot in a semiconductor wafer manufacturing facility, the system comprising:
   a sensor coupled to the robot, the sensor to obtain a vibration signal representative of vibration of the robot;
   a health monitor to:
     obtain a user selection of a feature to be extracted from the vibration signal;
     extract the feature from the vibration signal;
     compare the feature to a threshold; and
     in response to determining the feature satisfies the threshold, transmit an alert; and
   a fault classifier to:
     determine, using a multi-variable analysis based on the feature, whether the feature is a false alarm; and
     if the feature is a false alarm, transmit a message to a technician device indicating the alert was a false alarm.

2. The system of claim 1, wherein the feature is a median frequency, spectral energy, root mean square, or variance of the vibration signal.

3. The system of claim 1, wherein the robot is located in a clean room of the semiconductor wafer manufacturing facility.

4. The system of claim 3, wherein the health monitor is located in the clean room.

5. The system of claim 4, wherein the technician device is located outside of the clean room.

6. The system of claim 1, wherein the health monitor is to compare the feature to the threshold by determining whether the feature is within a multiple of a standard deviation of a mathematical combination of historical values of the feature.

7. The system of claim 1, wherein the sensor is a triaxial microelectromechanical systems (MEMS) accelerometer.

8. The system of claim 7, wherein the sensor is to obtain vibration data associated with movement in each of X, Y, and Z directions.

9. The system of claim 1, wherein the health monitor is to transmit the feature to the fault classifier.

10. The system of claim 1, wherein the fault classifier is to determine a type of fault associated with the feature.

11. The system of claim 1, wherein the fault classifier is implemented on a cloud-based computing device.

12. A method to monitor health of a robot in a semiconductor wafer manufacturing facility, the method comprising:
   obtaining a user selection of a feature to be extracted from a vibration signal associated with the robot;
   extracting, by executing an instruction with at least one processor, the feature of the vibration signal obtained by a sensor coupled to the robot;
   comparing the feature to a threshold; and
   generating, by executing an instruction with the least one processor, an alert when the feature satisfies the threshold.

13. The method of claim 12, wherein the generating of the alert includes transmitting the alert over a network to an electronic device to be presented to a user.

14. The method of claim 12, wherein the comparing of the feature to the threshold includes comparing the feature to a multiple of a standard deviation of a mathematical combination of a plurality of historical values of the feature.

15. The method of claim 12, further including communicating the feature to a fault classifier.

16. A non-transitory machine readable storage medium comprising instructions that, when executed, cause at least one machine to at least:
   obtain a user selection of a feature to be extracted from a vibration signal associated with a robot in a semiconductor wafer manufacturing facility;
   extract the feature of the vibration signal obtained by a sensor coupled to the robot;
   compare the feature to a threshold corresponding to a multiple of a standard deviation of a mathematical combination of a plurality of historical values of the feature; and
   generate an alert when the feature satisfies the threshold.

17. The non-transitory machine readable storage medium of claim 16, wherein the instructions, when executed, cause the at least one machine to transmit the alert over a network to an electronic device to be presented to a user.

18. The non-transitory machine readable storage medium of claim 16, wherein the instructions, when executed, cause the at least one machine to transmit the feature to a fault classifier.

19. The system of claim 5, wherein the fault classifier is remote from a manufacturing facility containing the clean room and the technician device.

20. The system of claim 5, wherein the fault classifier is outside of a firewall of a manufacturing facility containing the clean room and the technician device.

* * * * *